US006475084B2

(12) United States Patent
Tanibuchi et al.

(10) Patent No.: US 6,475,084 B2
(45) Date of Patent: Nov. 5, 2002

(54) VIDEO GAME DEVICE, PLAY CONTROL METHOD FOR VIDEO GAME, AND READABLE RECORDING MEDIUM RECORDING THE METHOD

(75) Inventors: Hiroshi Tanibuchi, Amagasaki (JP); Koji Maeda, Sakai (JP); Koji Toyohara, Kobe (JP); Tetsuro Eguchi, Kobe (JP)

(73) Assignee: Kabushiki Kaisha Konami Computer Entertainment Osaka, Osaka-fu (JP)

( * ) Notice: Subject to any disclaimer, the term of this patent is extended or adjusted under 35 U.S.C. 154(b) by 0 days.

(21) Appl. No.: 09/472,674

(22) Filed: Dec. 27, 1999

(65) Prior Publication Data

US 2002/0045485 A1 Apr. 18, 2002

(30) Foreign Application Priority Data

Dec. 28, 1998 (JP) .......................... 10-377115

(51) Int. Cl.⁷ ................................ A63F 13/00
(52) U.S. Cl. ............................ 463/3; 463/43
(58) Field of Search ............... 463/1–8, 31, 36, 463/37, 43, 44

(56) References Cited

U.S. PATENT DOCUMENTS

| | | | |
|---|---|---|---|
| 4,672,541 A | * | 6/1987 | Bromley et al. |
| 5,498,003 A | * | 3/1996 | Gechter |
| 5,680,534 A | * | 10/1997 | Yamato et al. |
| 5,695,401 A | * | 12/1997 | Lowe et al. |
| 5,720,663 A | * | 2/1998 | Nakatani et al. |
| 5,807,174 A | * | 9/1998 | Fukuhara et al. |
| 5,885,156 A | * | 3/1999 | Toyohara et al. .......... 463/1 |
| 5,947,823 A | * | 9/1999 | Nimura |
| 6,155,924 A | * | 12/2000 | Nakagawa et al. |

FOREIGN PATENT DOCUMENTS

| | | |
|---|---|---|
| EP | 0844580 | 5/1998 |
| EP | 0916376 | 5/1999 |
| JP | 8-293810 | * 11/1996 |
| JP | 10-211361 | 8/1998 |
| WO | 98/43715 | * 10/1998 |

OTHER PUBLICATIONS

M. E. Ryan: "Microsoft Baseball 3D" ONLINE!, Jun. 15, 1998, pp. 1–2, XP002136209 Retrieved from the Internet: <URL:WWW.gamespot.com/sports/msbase3d/printable_review.html> retrieved on Apr. 20, 2000! * p. 1, paragraph 5 *.

M. E. Ryan: "High Heat Baseball 1999" ONLINE!, Apr. 29, 1998, pp. 1–2, XP002136269 Retrieved from the Internet: <URL>WWW.gamespot.com/sports/highheat/printable_review.html> retrieved on Apr. 20, 2000! * p. 1, paragraph 6 *.

* cited by examiner

Primary Examiner—Michael O'Neill
(74) Attorney, Agent, or Firm—Jordan and Hamburg LLP

(57) ABSTRACT

A video game device has replacement character setting unit 70 for setting replacement characters in the game beforehand, and game progress control unit 80 for controlling the progress state of the game, by performing a replacement processing between a replacement character and one play character playing in the game, during the progress of the game. The game proceeds with replacement of player characters based on information concerning replacement characters selected by the user prior to the start of the game.

36 Claims, 11 Drawing Sheets

FIG. 10

VIDEO GAME DEVICE, PLAY CONTROL METHOD FOR VIDEO GAME, AND READABLE RECORDING MEDIUM RECORDING THE METHOD

BACKGROUND OF THE INVENTION

1. Field of the Invention

The present invention relates to a video game device wherein a play character on the video screen is caused to perform a simulation experience (playing) instead of the player, a play control method for the video game, and a readable recording medium storing the play control method.

2. Description of the Related Art

Conventionally, regarding playing games wherein the player performs a simulation experience as a play character on the video screen, there are known such wherein a predetermined play character is selected from a plurality of play characters to play. In this case, the selection of the play character is provided by ROM data. That is, in the event that the video game device is entrusted to commit a player which is a play character in a baseball game for example, during the game, the video game device commits a replacement character provided by ROM data following a predetermined algorithm according to the play progress state, based on capabilities of the play character relating to the game and attributes (for example, starting member type or relief type in a baseball game) that have been set beforehand.

However, in such cases, the game player is not allowed to select replacement characters beforehand, so conventional games are monotonous and cannot offer fun.

SUMMARY OF THE INVENTION

The present invention has been made in light of the above, and it is an object thereof to provide a video game device, a play control method for the video game, and a readable recording medium storing the play control method, wherein the game player is allowed to select replacement characters beforehand before the game begins.

In accordance with one aspect of the present invention, there is provided a video game device which sets a game space on a screen of a display means, and which causes play characters to execute a game within the game space, the video game device comprising: replacement character setting means for setting replacement characters in the game beforehand; and game progress control means for controlling the progress state of the game, by performing a replacement processing between the replacement character and one play character playing in the game, during the progress of the game.

In accordance with another aspect of the present invention, there is provided a video game play control method, comprising: setting replacement characters in the game beforehand; and controlling the progress state of the game by performing a replacement processing between the replacement character and one play character playing in the game during the progress of the game.

In accordance with still another aspect of the present invention, there is provided a computer-readable recording medium recording a video game play control method, the method comprising: setting replacement characters in the game beforehand; and controlling the progress state of the game, by performing a replacement processing between the replacement character and one play character playing in the game, during the progress of the game.

In accordance with these features of the present invention, the game progress state is controlled by the replacement character setting means which sets replacement characters in the game beforehand, and the game progress control means controlling the progress state of the game by performing a replacement processing for conducting replacement between the replacement character and one play character playing in the game during the progress of the game, so the game player can select replacement characters beforehand before the game begins. If the video game device is entrusted to commit a player which is a play character in a baseball game for example during the game, the video game commits a replacement character which the game player selected beforehand, following a predetermined algorithm according to the play progress state, based on capabilities of the play character relating to the game and attributes (for example, starting member type or relief type in a baseball game) that have been set beforehand. Accordingly, the game becomes rich in variation, and extremely absorbingly interesting.

The above and other objects, features and advantages of the present invention will become clear from the following description when the same is read in conjunction with the accompanying drawings.

BRIEF DESCRIPTION OF THE DRAWINGS

Figure 10:
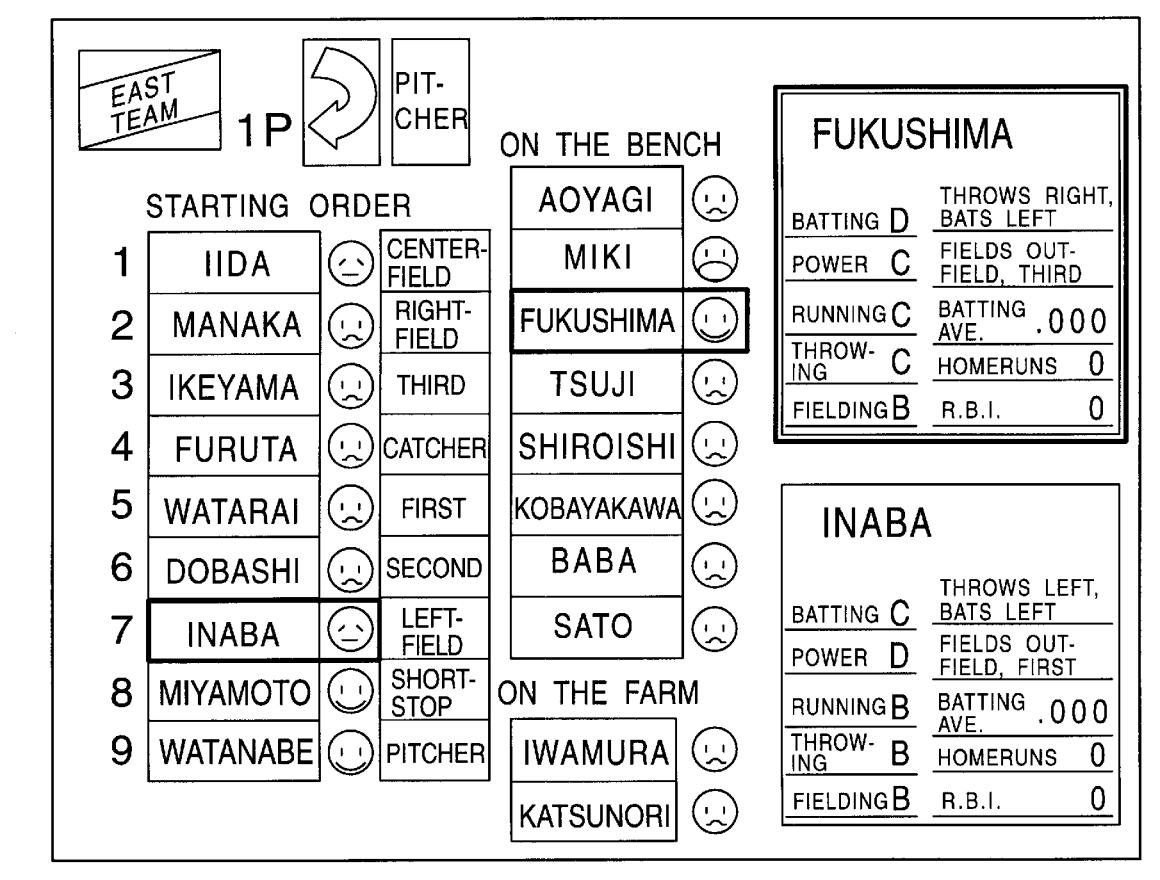

FIG. 10 is an illustration of a display screen used in a video game; and

DESCRIPTION OF THE PREFERRED EMBODIMENT

Figure 1:
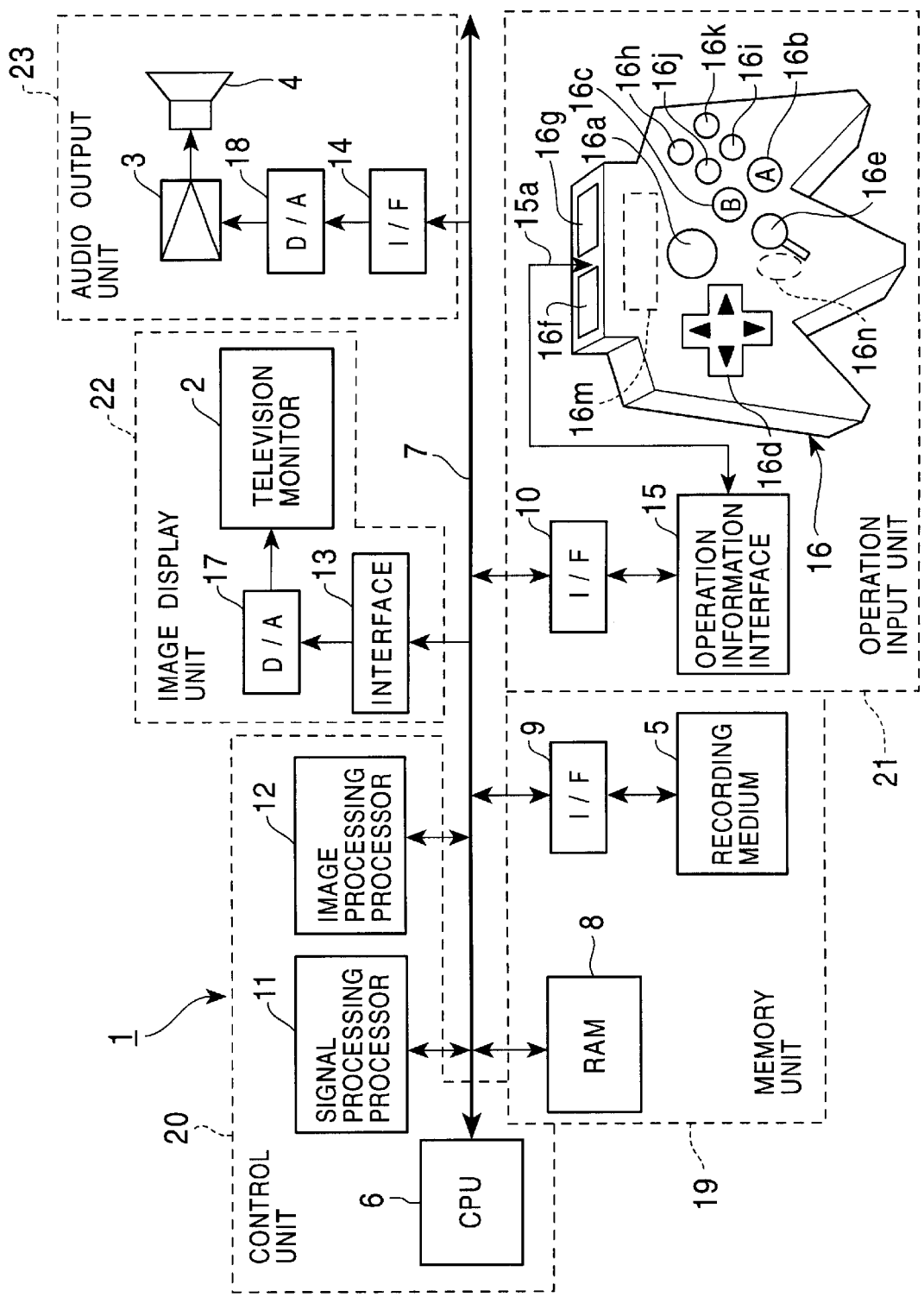
FIG. 1 is a block diagram showing the configuration of a game system as an embodiment of the present invention.

FIG. 1 is a configuration diagram illustrating a game system 1 as an embodiment of the present invention.

The game system 1 is comprised of a main game unit, a television monitor 2 which is a display unit for displaying game screens (hereafter referred to as "monitor"), an amplifying circuit 3 and speaker 4 for outputting game audio, and a recording medium 5 whereupon are recorded game programs comprised of image data, sound data and program data. The recording medium 5 consists of a so-called ROM cassette wherein program data such as the above game programs or operating system is recorded in ROM or the like which is stored in a plastic case, or of an optical disk, a flexible disk, etc.

The main game unit is configured such that a bus 7 consisting of an address bus, data bus, and control bus is connected to a CPU 6, and connected to this bus 7 are a RAM 8, an interface circuit 9, interface circuit 10, signal processing processor 11, image processing processor 12, interface circuit 13, and interface circuit 14, with a controller 16 being connected to the interface circuit 10 via an operation information interface circuit 15, a D/A converter 17 being connected to the interface circuit 13, and a D/A converter 18 being connected to the interface circuit 14.

Now, a memory unit 19 is comprised of the above RAM 8, interface circuit 9, and recording medium 5; a control unit 20 for controlling the progressing of the game is comprised of the above CPU 6, signal processing processor 11, and image processing processor 12; an operation input unit 21 is configured of the above interface circuit 10, operation information interface circuit 15, and controller 16; an image display unit 22 is comprised of the above monitor 2, interface circuit 13, and D/A converter 17; and an audio output unit 23 is configured of the above amplifying circuit 3, speaker 4, interface circuit 14, and D/A converter 18.

The signal processing processor 11 performs mainly calculations in three-dimensional space, calculations for performing conversion from positions in three-dimensional space to positions in simulated three-dimensional space, light source calculating processing, and, generating and working processing for sound data.

The image processing processor 12 performs writing processing for image data to be drawn to a display area of the RAM 8, i.e., writing processing of texture data, based on the calculation results from the signal processing processor 11.

The controller 16 has, as an operating portion externally operable, a start button 16*a*, an A button 16*b*, a B button 16*c*, a cross key 16*d*, a stick-type controller 16*e*, a left trigger button 16*f*, a right trigger button 16*g*, a C1 button 16*h*, a C2 button 16*i*, a C3 button 16*j*, a C4 button 16*k*, and a depth trigger button 16*n*, such that operating signals according to the operation contents to the buttons are sent to the CPU 6.

The stick-type controller 16*e* is almost the same configuration as a joystick. That is, it has a vertically erected stick, and is configured such that this stick can be inclined in all directions 360°, including forwards, rear, left and right, with the home position of this stick serving as a pivot, and is arranged such that the X-coordinates in the left and right and the Y-coordinates in the forward and rear directions with the erected position as the position of origin are output to the CPU 6 via the interface circuits 15 and 10, according to the direction of inclining and degree of inclining the stick.

Also, the controller 16 has a connector 16*m* to which card-type memory or the like is attachable for temporarily storing the progress state of the game, for example.

The above game system 1 differs in form according to the use thereof.

That is, in the event that the game system 1 is configured for home use, the monitor 2, amplifying circuit 3, and speaker 4 are separate form the main game unit. Also, in the event that the game system 1 is configured for commercial use, all of the components shown in FIG. 1 are stored in a single integral housing.

Also, in the event that the game system 1 is configured around a personal computer or workstation, the monitor 2 corresponds to the display for the above computer, the image processing processor 12 corresponds to a portion of the game program data recorded in the recording medium 5 or hardware on an expansion board mounted in an expansion slot of the computer, the interface circuits 9, 10, 13, and 14, the D/A coverts 17 and 18, and the operation information interface circuit 15 correspond to hardware on an expansion board mounted in an expansion slot of the computer. Also, the RAM 8 corresponds to the main memory of the computer of various areas in expansion memory.

With the present embodiment, a description will be made with reference to an example of the game system 1 being configured for home use.

Next, description will be made regarding the general actions of the game system 1.

At the time that the power switch (omitted in the Figures) is turned on and power is supplied to the game system 1, the CPU 6 reads game programs consisting of image data, sound data and program data from the recording medium 5, based on the operating system stored in the recording medium 5. Part or all of the read game program is stored in the RAM 8.

Subsequently, the CPU 6 performs progress of the game, based on the game programs stored in the RAM 8, and the contents instructed by the game player via the controller 16. That is, the CPU 6 generates commands as tasks for drawing or sound output as appropriate, based on the operating signals sent out from the controller 16 according to the operation contents of the game player to the controller 16.

The signal processing processor 11 performs calculations of the position and the like of play characters in three-dimensional space (of course, this is true for two-dimensional space as well) and light source calculations based on the above commands, and also has functions for performing sound data generation processing.

Next, the image processing processor 12 performs writing processing and the like of image data to be drawn on the display area (frame buffer) of the RAM 8, based on the above calculation results. The D/A converter 17 converts the image data written into the RAM 8 into analog image signals at each predetermined cycle via the interface circuit 13, and displays these as images on the tube screen of the monitor 2.

On the other hand, the sound data output from the signal processing processor 11 is supplied to the D/A converter 18 via the interface circuit 14, and is converted into analog sound signals here, following which is output from the speaker 4 via the amplifying circuit 3 as background sounds, sound effects, and voice.

Next, an overview of the video game executed by the game program recorded in the recording medium 5 will be described, with reference to FIG. 8 through FIG. 11. FIG. 8 through FIG. 11 are diagrams each illustrating a game screen. Incidentally, in the following, play characters will be referred to as "players", for the sake of convenience.

With the present video game, pro baseball players (play characters) play a baseball game, following the operation of the controller 16 by the game player. At this time, the game player can select replacement characters beforehand before the game begins, and in the event that the video game device is entrusted to commit a player which is a play character in a baseball game for example, during the game, the video game acts to commit a replacement character which is derived from the ROM data following a predetermined algorithm according to the play procession state, based on capabilities of the play character relating to the game and attributes (for example, starting member type or relief type in a baseball game) that have been set beforehand (see FIG. 8, FIG. 9).

Here, "replacement character" refers to a play character which is going to be playing in the game in place of a play character which has been playing in the game; and "commit"

means an operation performed by the video game device to put into the game a play character which has not participated in the game but has been selected beforehand as a replacement character, in place of a play character which has been playing in the game. Also, "replace" means an action taken by the video game device to exchange a play character which is presently playing in the game with a play character which is not presently playing in the game. This holds in the following, as well.

Figure 8:
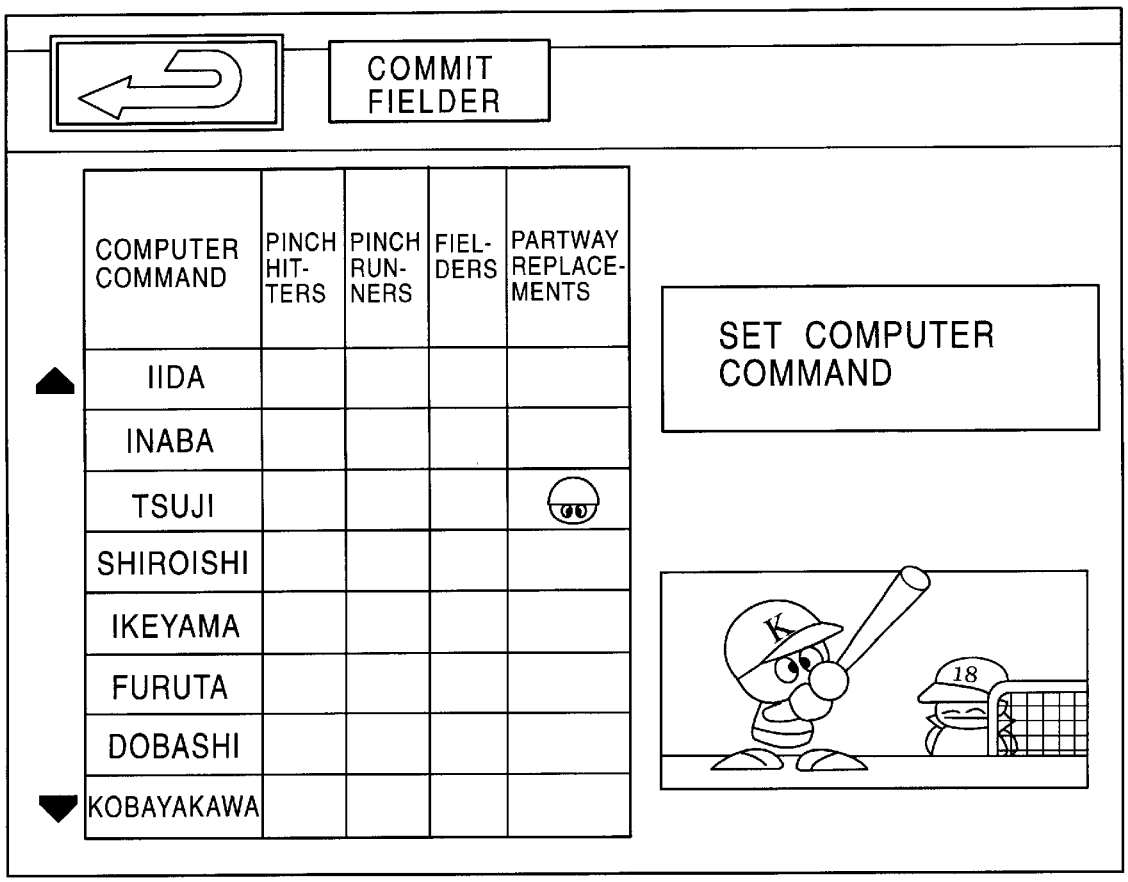
FIG. 8 is an illustration of a display screen used in a video game.

Specifically, as shown in FIG. 8, shown at the upper part of the screen are frames for characters serving as pinch hitter members, pinch runner members, and fielding members, capable of serving as replacement characters. Along with these frames displayed is a frame of partway-replacement members of the fielders who are presently playing in the game, but may be replaced. The names of these play characters are listed at the left side of the screen. The game player can scroll these names on the screen by means of the controller 16, so play characters other than these can be selected, as well. Also, on the screen, "Tsuji" is set as a partway-replacement member, and is indicated by an icon like a face so that the game player can tell that this setting has been made. The operations for the game player to set replacement characters in the frames for pinch hitter members, pinch runner members, fielding members and partway-replacement members (hereafter referred to as "pinch hitter members and the like"), for example, the cursor is used by operating the controller 16 for example, following which a predetermined button is pressed.

Figure 9:
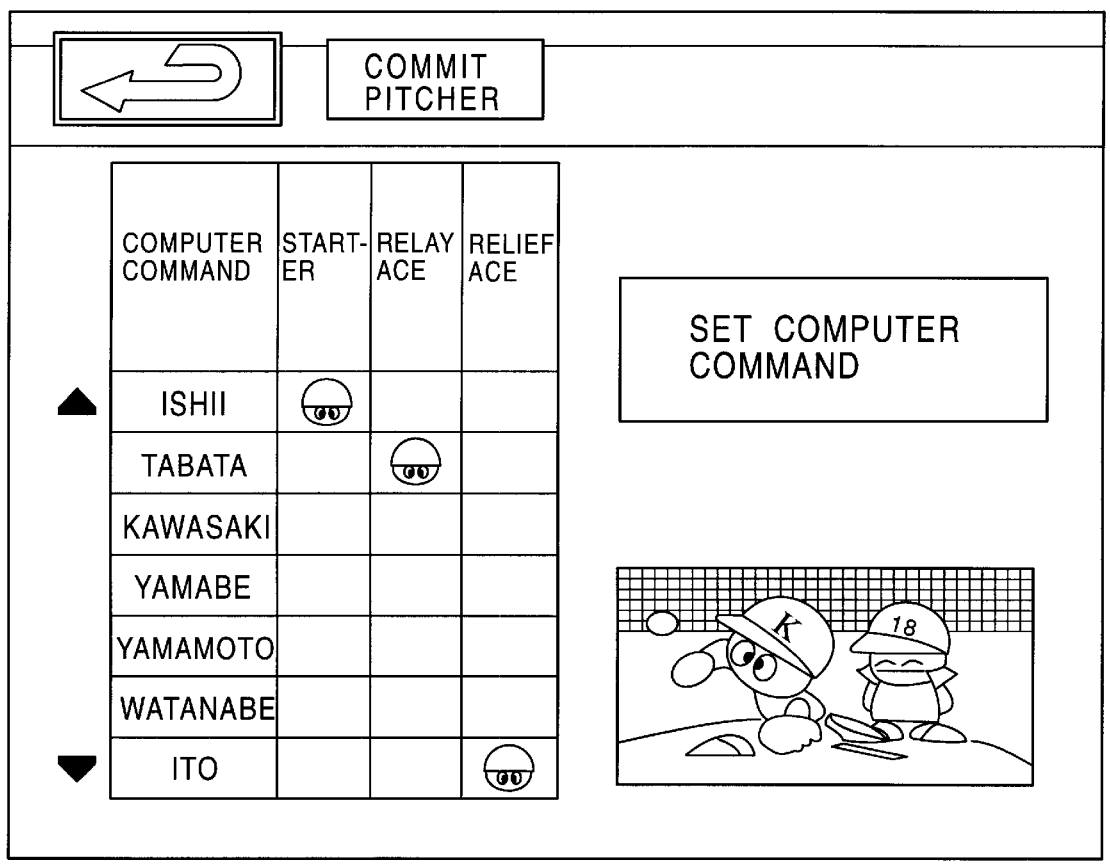
FIG. 9 is an illustration of a display screen used in a video game.

FIG. 9 is a screen of having decided on the starting pitcher, relay ace, and relief ace. Here, frames are displayed for starter, relay ace, and relief ace, and displayed to the left are the names of players capable of playing.

Figure 11:
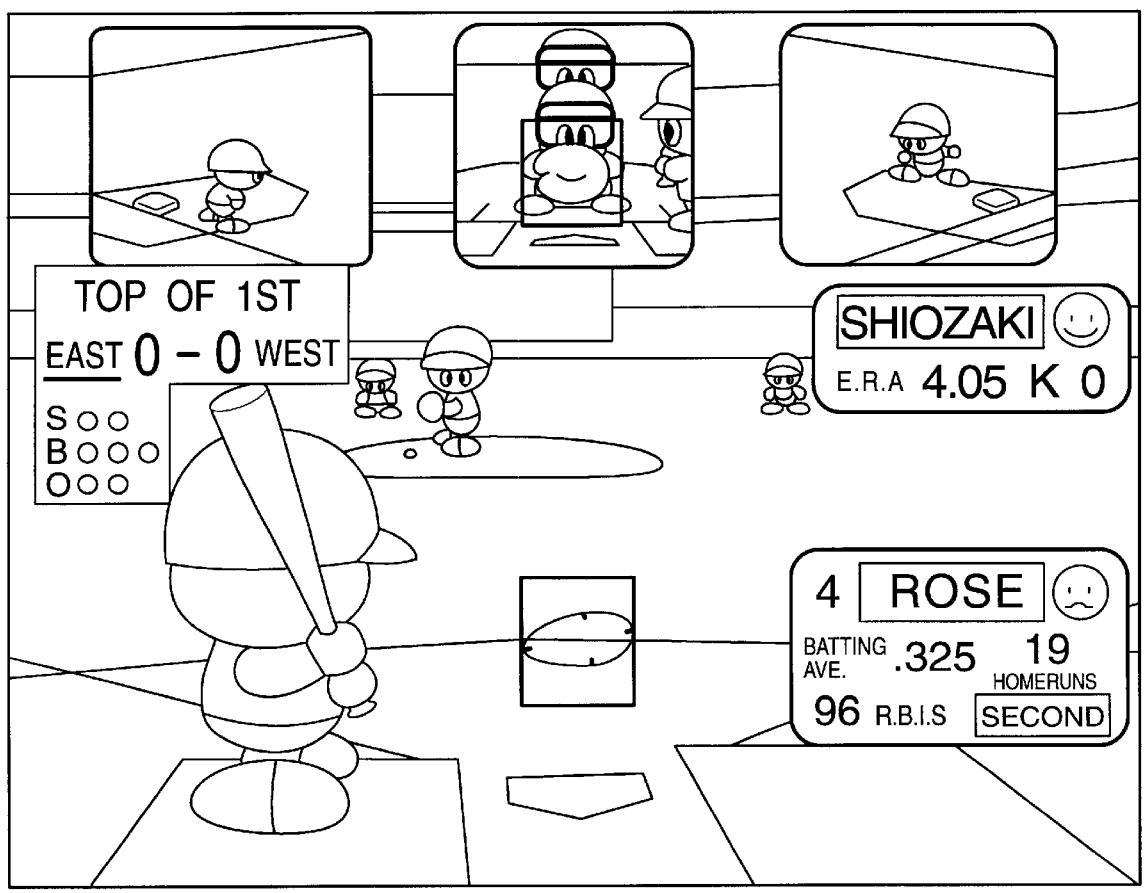
FIG. 11 is an illustration of a display screen used in a video game.

The play characters, which are players of each team, thus set, are registered as individuals capable of playing (starting order players and reserve bench players). That is, the play characters are displayed on the screen as a selectable menu. Then, a player for the side at bat whose name has been selected from the above menu undertakes a competition action called standing in the batter's box as a batter, as shown in FIG. 11, and waits for the pitch from the opponent pitcher player. Alternatively, he undertakes a competition action called being on base as a runner. At this time, the position of the catcher's mitt is displayed at the upper center of the screen. Also, in the event that there are runners, the runners are displayed at the left and right of the upper part of the screen.

Also, as shown in the same Figure, for the fielding side, the play character undertakes a competition action called standing on the pitcher's mound and pitching to an opposing batter. Alternatively, he undertakes a competition action called scattering to one of respective fielding positions to play as a fielder.

Figure 2:
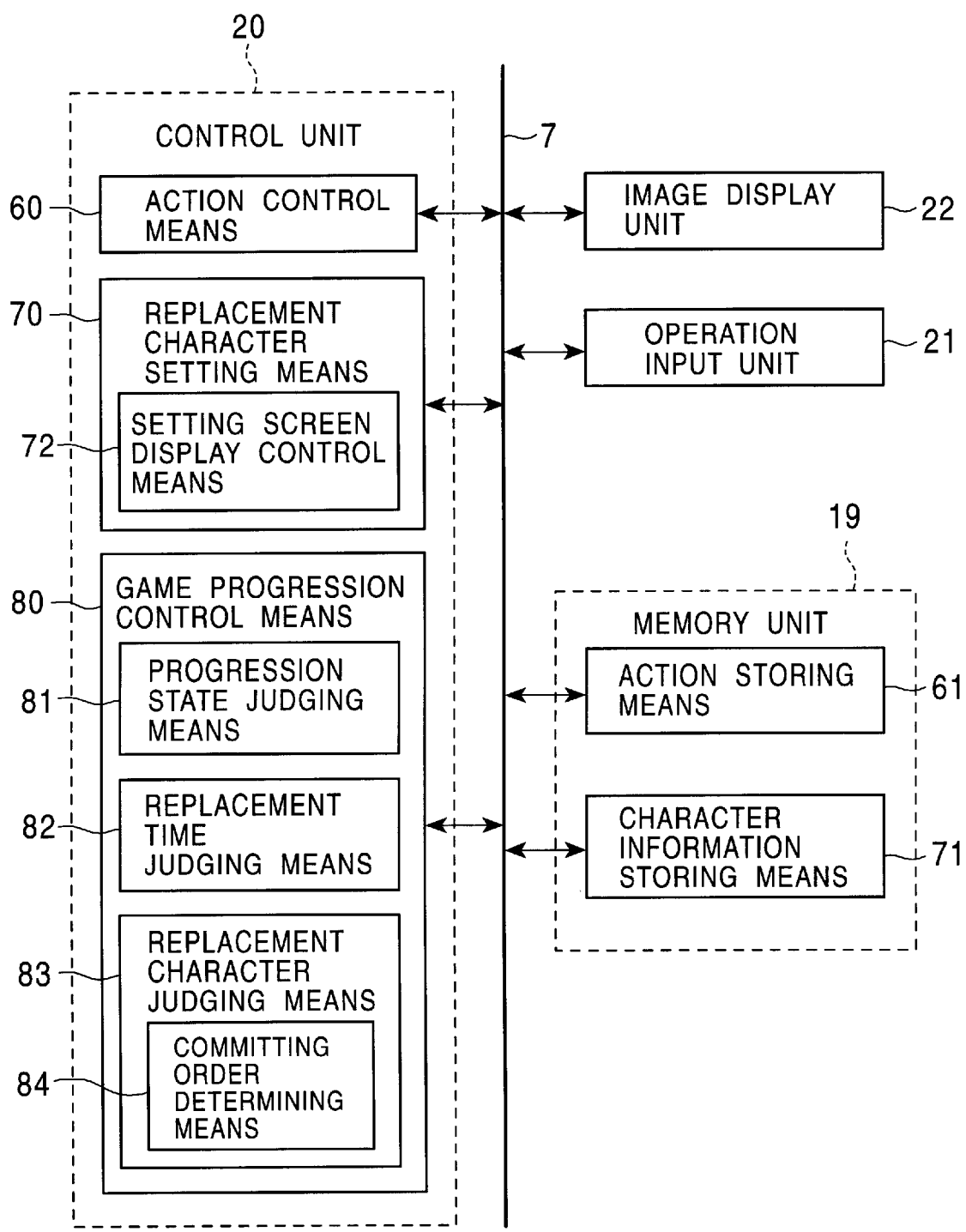
FIG. 2 is a function block diagram showing major components of the game device.

Next, FIG. 2 is a functional block diagram of the major portions of the game system shown in FIG. 1. Incidentally, in the following, a case wherein application is made to a baseball game as described above is explained by way of example, in order to facilitate ease of understanding.

As shown in the Figure, the video game device according to the present embodiment (hereafter referred to as "present device") is provided with an image display unit (display device) 22 containing a monitor 2 and so forth for displaying menus corresponding to various actions of the players, as well as players which are play characters and the action contents thereof; an operating input unit (operating unit) 21 which includes an operating controller 16 and so forth for selectively appointing a menu regarding arbitrary actions out of these various menus; an action storing means 61 of a memory unit 19 having a recording medium 5 and so forth for storing the action contents of the game character in a manner corresponding to the operation contents instructed by the operating input unit 21; an action control means 60 for reading from the action storing means 61 the action contents according to the instructions from the operation input unit 21 and causing the play character to perform the same; a replacement character setting means 70 for setting replacement characters for the game beforehand; and a game progress control means 80 for controlling the game progress state by performing a replacement processing to replace a play character which is playing in the game with the above-mentioned replacement character, during the progress of the game.

Also provided is a character information storing means 71 for storing multiple character information, and the replacement character setting means 70 sets the replacement characters by making reference to the character information. The replacement character setting means 70 further comprises a setting screen display control means 72 for displaying the screen for enabling setting of the replacement characters on the display screen.

The game progress control means 80 comprises a game progress state judging means 81 for judging the state of progress of the game, and gives an instruction to effect the replacement based on the state of the progress of the game. Also, the game progress control means 80 comprises, besides the progress state judging means 81 for judging the progressing of the game, a replacement time judging means 82 for judging the time at which the replacement of the character is to be conducted, with the replacement being performed at this judged replacement time. The progress state judging means 81 judges the progress state of the game based on predetermined conditions.

The game progress control means 80 further comprises a replacement character judging means 83 for judging which replacement character is to be committed out of the replacement characters, based on the game progress state data, when a plurality of the replacement characters have been set by the replacement character setting means 70, so that this judged replacement character is committed. Further, the replacement character judging means 83 comprises a committing order determining means 84 for determining the order or sequence of commitment of the replacement characters.

The replacement character setting means 70 is capable of setting the replacement characters for each of a series of games. The character information includes role data (e.g., being capable of replacement as a relief pitcher in a baseball game, etc.) of replacement characters in the game, or special characteristics data (e.g., the play character being easily injured, etc.) of replacement characters in the game.

Further provided are event storing means 85 for storing events, and event control means 86 for generating events occurring during the game, and judging whether a play character has become the object of this event that occurred. The events are, for example, an injury event and other special events.

Also, the competition action storing means 61, character information storing means 71, and event storing means 85 are configured within the memory unit 19. Meanwhile, the competition action control means 60, replacement character setting means 70, setting screen display control means 72, game progress control means 80, progress state judging means 81, replacement time judging means 82, replacement character judging means 83, and committing order determining means 84, are implemented in the context of execution format game program configured within the CPU 6 of the control unit 20. That is, a portion of the program data provided a program that implements the above-mentioned virtual functional processing units such as the action storing means 60 and so forth within the CPU 6. Accordingly, the above function processing units exhibit their respective functions according to the action of the CPU 6, so in the following, operations will be described on the basis of the function processing units.

Next, the actions of the present device will be described with reference to the flowcharts in FIG. 3 through FIG. 7. The video game play control method can be implemented by these actions.

Figure 3:
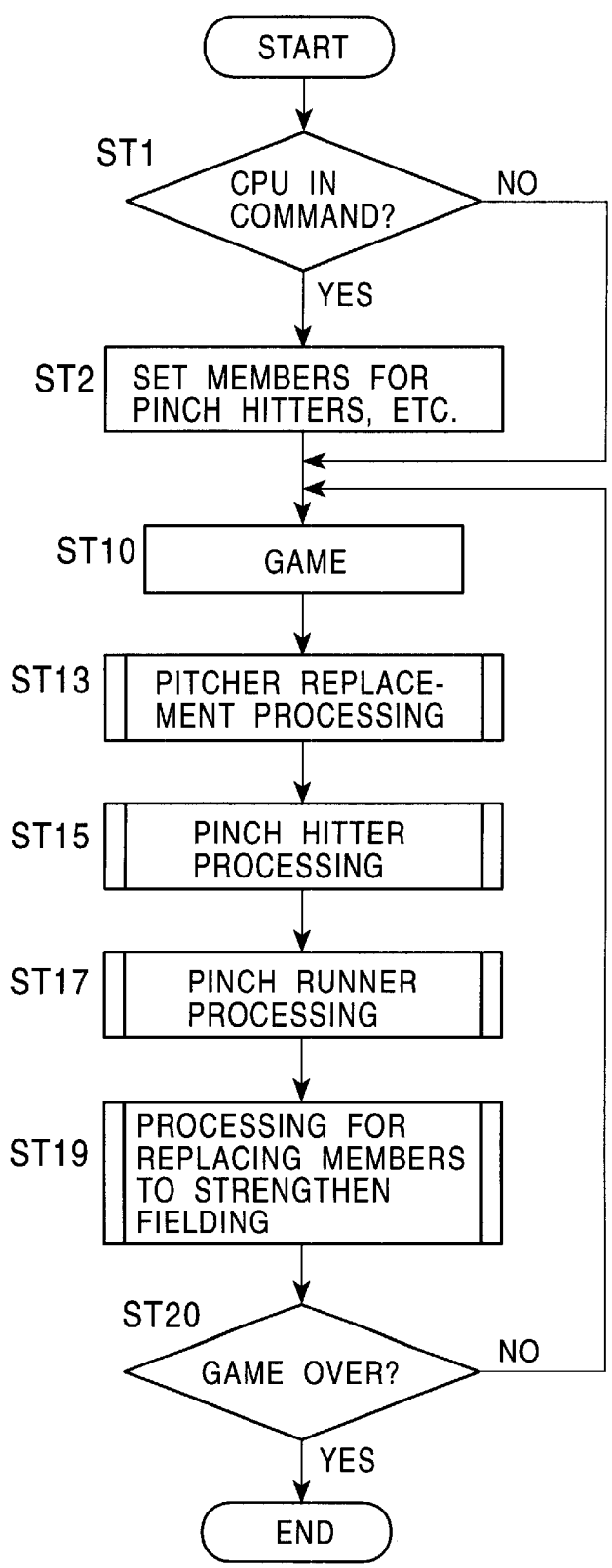
FIG. 3 is a flowchart schematically showing the operation of the game device.
Figure 4:
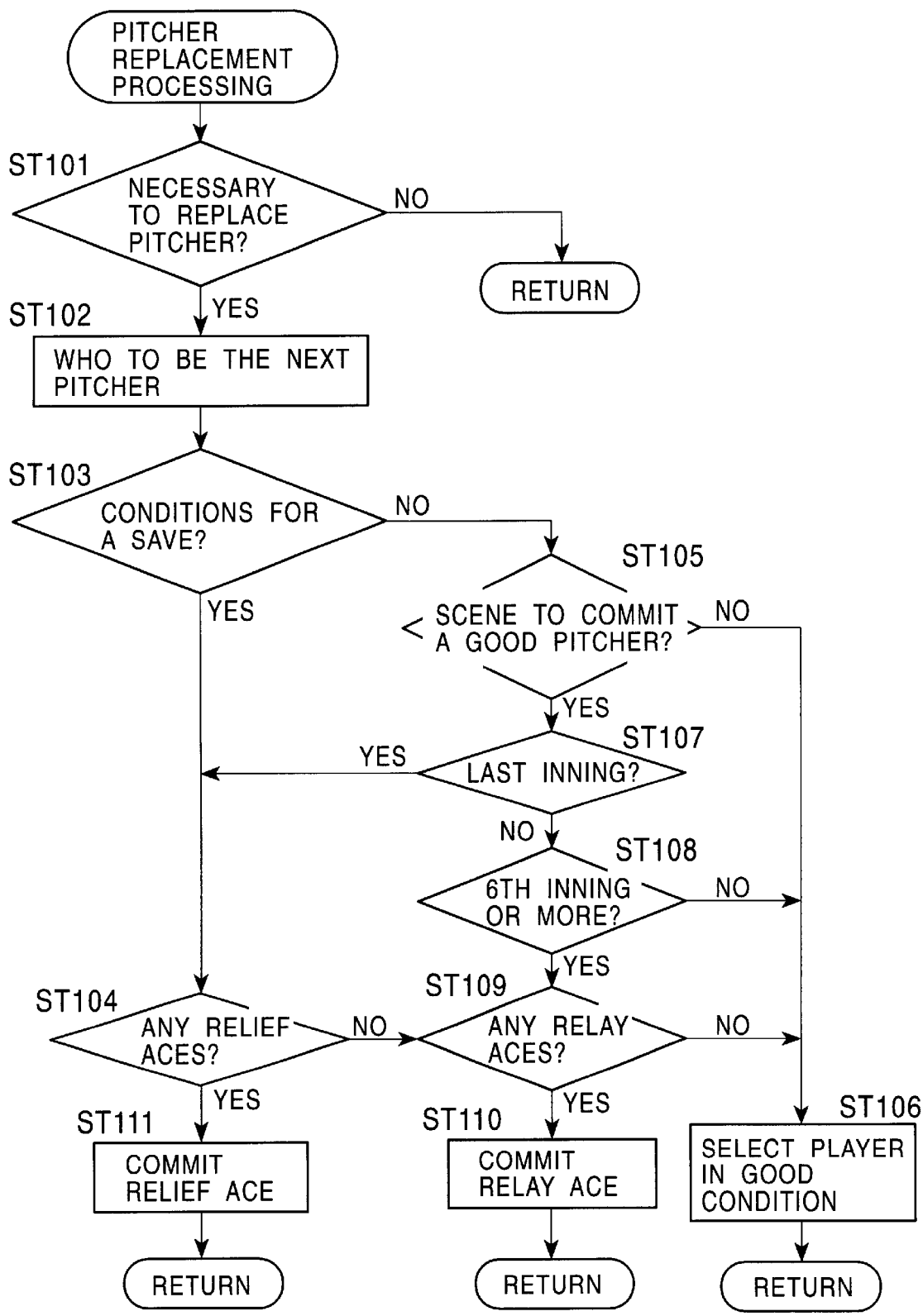
FIG. 4 is a flowchart schematically showing the operation of the game device.
Figure 5:
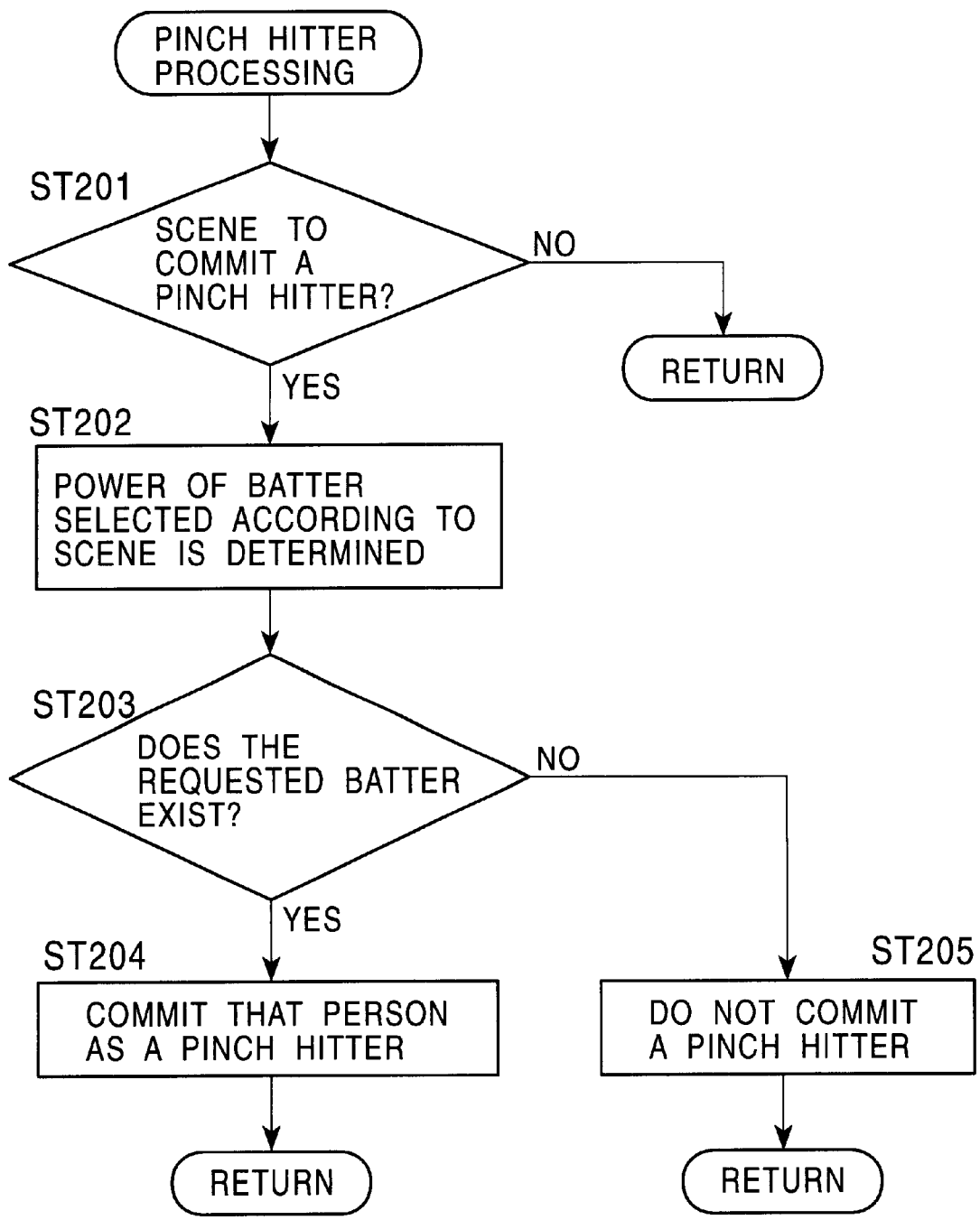
FIG. 5 is a flowchart schematically showing the operation of the game device.
Figure 6:
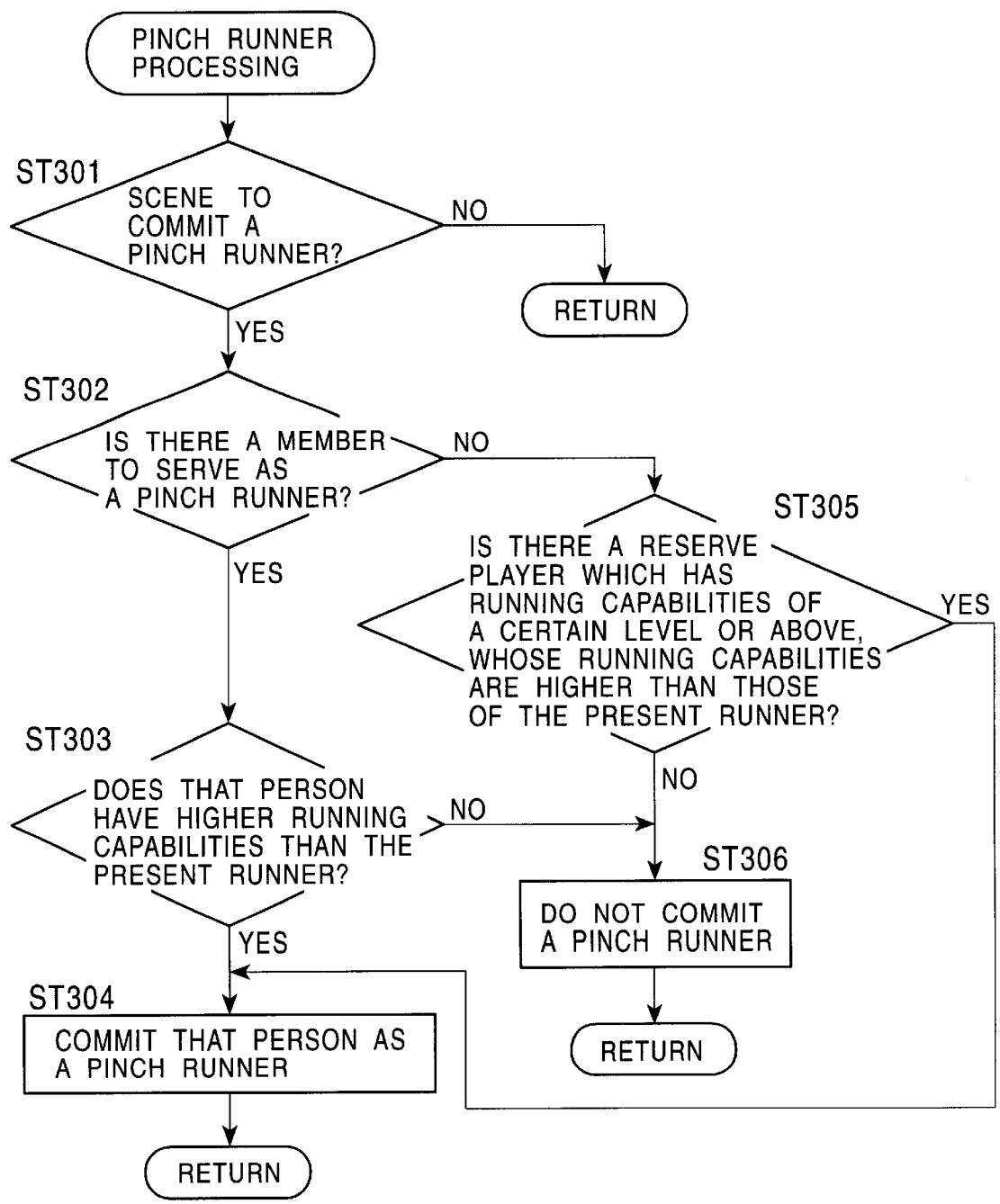
FIG. 6 is a flowchart schematically showing the operation of the game device.
Figure 7:
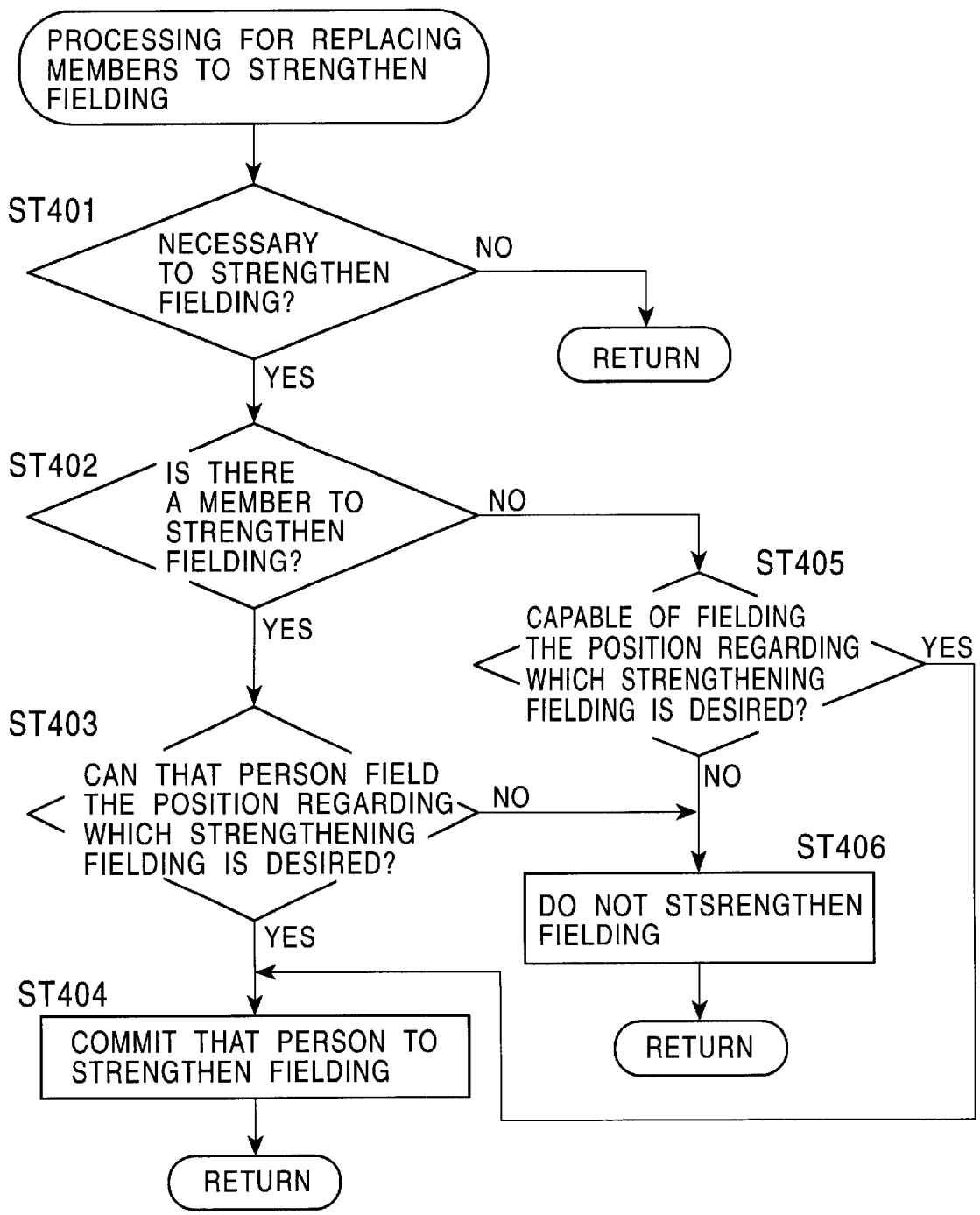
FIG. 7 is a flowchart schematically showing the operation of the game device.

First, in FIG. 3, determination is made whether or not a CPU commanding mode wherein the game player operates the controller 16 for setting pinch hitter members and the like is implemented (step ST1). In the event that judgment is made that the CPU is commanding (YES in step ST1), setting of pinch hitter members and the like is made by the replacement character setting means 70 (step ST2). The pinch hitter and other members thus set are on the bench as relief players in the baseball game, and the game is started by the starting order players (step ST10). On the other hand, determination that the CPU is not in command (NO in step ST1) means that a ROM command mode has been implemented wherein the pinch hitter members are automatically decided, so the above step ST2 is skipped and the flow directly proceeds to step ST10. Next, pitcher replacement processing (step ST13), pinch hitter processing (step ST15), pinch runner processing (step ST17), and fielding strengthening member replacing processing (step ST19) is sequentially executed by the game progress control means 80. The above step ST10 through ST19 are repeated until the game ends (step ST19).

Incidentally, judgement is made before the above step ST1 regarding whether or not the game player directly commands during the game, and in the event that judgment is made that the game player directly commands during the game, the game player can command in real-time. On the other hand, in the event that judgment is made that the game player will not directly command during the game, the above steps beginning from step ST1 are executed. The following is a detailed description of the above step ST2 through ST19.

Step ST2

Setting of the pinch hitter members and the like is made by the game player operating the controller 16, by causing the replacement character setting means 70 to make reference to the character information stored beforehand in the character information storing means 71, so as to set one or multiple players as members for pitcher, pinch hitter, pinch runner, and fielding strengthening member, in the baseball game. At this time, the setting screen for the pinch hitter members, etc., is displayed by the setting screen display control means 71 as shown in FIG. 8 and FIG. 9, so the game player can easily set the pinch hitter members, etc., by viewing this screen.

Thus, pinch hitter members, etc., can be set according to character information, so the game has a realistic sensation, and is absorbingly interesting. Also, with an arrangement wherein the setting of the pinch hitter members, etc., is made each time a game is played, the game does not become monotonous, but rather becomes rich in variation. Of course, a mode is available wherein one setting can be used for multiple games, or wherein one setting is used for all games until cancelled.

Step ST10

Here, the pinch hitter members, etc., are on the bench, and the game is started by the starting order players. The actions of each player during the game is achieved by the action of the action control means 60 following the action program data stored in the action storing means 61 beforehand, and this also is displayed on the screen. This also is true for the action of the pinch hitter members, etc., following replacement.

Step ST13

Next is pitcher replacement processing. The flowchart in FIG. 4 will now be referred to in order to describe this pitcher replacement processing.

First, judgement is made by the replacement time judging means 82 of the game progress control means 80 regarding whether or not it is the time to replace the pitcher (step ST101). Now, conditions for replacement are: the stamina of the current pitcher being at or below a predetermined level; having been hit too much; conditions where [a relief pitcher] would get a save; etc. On the other hand, conditions for not replacing are: that the starting pitcher has given less than one hit or has given no runs; the starting pitcher has been set to pitch an entire game and his own team is leading with a margin of no more than two runs; etc. Thus, timely and precise player replacement can be expected, by means of judgement being made according to the progress state of the game, and further under various conditions such as the above conditions being the replacement time for replacing, or, conditions for not replacing, and so on.

Now, in the event that judgement is made that it is not time for a pitcher replacement (NO in step ST101), the flow returns. On the other hand, in the event that judgement is made that it is time for pitcher replacement (YES in step ST101), judgement is made by the replacement character judging means 83 regarding who will be then next pitcher (Step ST102).

In the event that the conditions are such that there is not going to be a save (NO in step ST103), the committing order determining means 84 of the replacement character judging means 83 selects players in the priority order of relief and relay. At this time, reference is made to the special characteristics data of the character information stored in the above character information storing means 71. Otherwise (YES in step ST103), the player is selected based on data relating to the condition of the player, from the character data. However, in the event that the difference in score is too great, a relief ace or relay ace is not selected. In a pennant mode, recovery information in the character information is also referred to. In this way, multiple players are set for pinch hitter members, etc., and high-level judging elements such as the need to determine the order of committing are added, so the game has a realistic sensation, and is absorbingly interesting.

Specifically, in the event that YES holds in the above step ST103, judgement is made regarding whether or not there is a relief ace (step ST104). In the event that NO holds in the above step ST103, judgement is made regarding whether or not this is a scene to use a good pitcher. In the event that judgment is made that this is a scene to use a good pitcher (NO in step ST105), a player in good condition is selected (step ST106), and the flow returns. However, in the event that judgment is made that this is not a scene to use a good pitcher (YES in step ST105), judgment is made regarding whether the inning is the last inning or not (step ST107). Now, in the event that judgment is made that the inning is the last inning (YES in step ST107), the flow proceeds to the above step ST104. On the other hand, in the event that judgment is made that the inning is not the last inning (NO in step ST107), judgment is made regarding whether the inning is the sixth inning or later (step ST108). Here, in the event that judgment is made that the inning is not the sixth inning or later (NO in step ST108), the flow proceeds to step ST106. On the other hand, in the event that judgment is made that the inning is the sixth inning or later (YES in step ST108), or in the event that judgment is made that there is no relief ace (NO in step ST104), judgement is made regarding whether or not there is a relay ace (step ST109). In the event that judgment is made that there is no relay ace (NO in step ST109), the flow proceeds to step ST106. On the other hand, the event that judgment is made that there is a relay ace (YES in step ST109), the relay ace is committed (step ST110) and the flow returns. On the other hand, the event that judgment is made that there is a relief ace (YES in step ST104), the relief ace is committed (step ST111) and the flow returns. That is, once the player has been decided upon as described above, a value is set to the work for executing the player replacement by the game progress control means 80, and the player replacement is executed. Step ST15

Next is pinch hitter processing. This pinch hitter processing will be described with reference to the flowchart in FIG. 5.

First, judgement is made regarding whether or not it is the time to commit a pinch hitter, by the replacement time judging means 82 of the game progress control means 80 (step ST201). That is, first, the judging routine differs according to the fielding position of the player regarding which a pinch hitter is to be committed. For example, in the event that the player for which a pinch hitter is to be committed is the pitcher, judgement is made based on the state such as the inning, stamina, difference in score, and so forth. Also, in the event that the player for which a pinch hitter is to be committed is a fielder, judgement is made based on the inning, capabilities, and so forth. That is, a pinch hitter is not put in to replace with a popular player. A check is made regarding whether or not there will be adverse effects in the event that the player leaves the game.

Now, in the event that judgement is made it is not the time to commit a pinch hitter (NO in step ST201), the flow returns. On the other hand, in the event that judgement is made it is time to commit a pinch hitter (YES in step ST201), the power (capability points) necessary for the pinch hitter member selected in this scene is determined (step ST202). In the event that the setting has been made for the pinch hitter member here, the capability points are added unto.

Next, the replacement character judging means 83 searches for a player which has a predetermined amount of batting capabilities above the player currently playing. That is, judgment is made regarding whether or not there is a player with the requested power (step ST203). Now, in the event that judgment is made that there is a player with the requested power (YES in step ST203), that player is committed as a pinch hitter (step ST204), and the flow returns. On the other hand, in the event that judgment is made that there is no player with the requested power (NO in step ST203), no pinch hitter is put in (step ST205), and the flow returns. That is, once committing a pinch hitter has been decided upon as described above, a value is set to the work for executing the player replacement by the game progress control means 80, and the player replacement is executed. Step ST17

A pinch runner processing will now be described. This pinch runner processing will be described with reference to the flowchart in FIG. 6.

First, judgement is made regarding whether or not it is the time to commit a pinch runner, by the replacement time judging means 82 of the game progress control means 80 (step ST301). Now, in the event that the present runner is slow, and it is judged that the game can be won by that runner scoring, judgement is made it is time to commit a pinch runner (YES in step ST301). However, the inning and the score are also considered when determining the pinch runner is to be used. On the other hand, in the even that judgement is made it is not time to commit a pinch runner (NO in step ST301), the flow returns.

In the event that judgement is made it is time to commit a pinch runner (YES in step ST301), the replacement character judging means 83 judges whether or not there is a pinch runner member (step ST302). In the event that judgement is made there is a pinch runner member (YES in step ST302), judgement is made whether or not that pinch runner member is faster than the current runner (step ST303). Now, in the event that judgment is made that the pinch runner member is faster than the current runner (YES in step ST303), that player is committed as a pinch runner (step ST204), and the flow returns. That is to say, in the event that there is a player who is faster than the current runner, and is set as a pinch runner member, that player is selected.

On the other hand, in the event that judgment is made that there is no pinch runner member (NO in step ST302), judgement is made whether or not there is a player in the reserve players with running capabilities of a predetermined level or faster and who is faster than the present runner (step ST305). Now, in the event that such a reserve player is judged to exist (YES in step ST305), the flow proceeds to step ST304.

On the other hand, even in the event that there is a pinch runner member, in the event that judgement is made that the pinch runner member is not faster than the present runner (NO in step ST303) or that there is no player in the reserve players with running capabilities of a predetermined level or faster and who is faster than the present runner (step ST305), no pinch runner is put in (step ST306), and the flow returns. That is, once committing a pinch runner has been decided upon as described above, a value is set to the work for executing the player replacement by the game progress control means 80, and the player replacement is executed. Step ST19

Next is fielding strengthening member replacement processing. This fielding strengthening member replacement processing will be described with reference to the flowchart in FIG. 7.

First, judgement is made regarding whether or not it is the time to strengthen fielding, by the replacement time judging means 82 of the game progress control means 80 (step ST401). Consideration here is given to whether there is a player currently fielding who has been set to be replaced partway through, or whether that player is in the players on the bench, in the event that the inning is more than halfway through the game and the team is leading by 3 points or more but by less than 6 points.

Now, in the even that judgement is made it is not time to strengthen fielding (NO in step ST401), the flow returns. On the other hand, in the event that judgement is made it is time to strengthen fielding (YES in step ST401), the replacement character judging means 83 judges whether or not there is a fielder member in the replacement players (step ST402).

Now, in the event that judgment is made that there is no fielder member in the replacement players (NO in step ST402), the flow returns. On the other hand, in the event that judgment is made that there is a fielder member in the replacement players (YES in step ST402), judgement is made regarding whether or not that player can field the fielding position of the player set to be replaced partway through (step ST403).

Now, in the event that it is judged that the player is capable of fielding the position regarding which strengthening of fielding is desired, that player is deployed to strengthen fielding (step ST404), and the flow returns. On the other hand, in the event that judgement is made that there are no fielding members in the replacement players (YES in step ST402), judgement is made judgement is made regarding whether or not there are any players in the replacement players who can field the fielding position regarding which strengthening of fielding is desired (step ST405).

Now, in the event that it is judged that there is such a reserve player (YES in step ST405), the flow proceeds to the above step ST404. That is, a player of the reserve players is selected who is capable of fielding the fielding position of the player set to be replaced, and who has fielding capabilities of a predetermined level or above, and who has the highest fielding capabilities. On the other hand, even in the event that there are fielding members, in the event that judgement is passed that the player is not capable of fielding the fielding position of the player set to be replaced partway through (NO in step ST403), or in the event that judgement is passed that there are no players in the reserve players capable of fielding the position regarding which strengthening of fielding is desired (NO in step ST405), strengthening of fielding is not performed (step ST406), and the flow returns. That is, once committing a player for strengthening of fielding has been decided upon as described above, a value is set to the work for executing the player replacement by the game progress control means 80, and the player replacement is executed.

As will be seen from the foregoing description, the game progress control means operates during progress of the game such that a play character on the playground is replaced with a replacement character selected from replacement characters that have been set beforehand by the replacement character setting means, thereby controlling the progress of the game. Thus, the user, i.e., the game player, is allowed to select the replacement characters at his discretion prior to the start of the game. When the user has entrusted the video game device to commit a play character, e.g., a baseball game player, the video game device by itself commits replacement characters that have been selected beforehand by the user before the start of the game, in accordance with the state of progress of the game and following a predetermined algorithm, based on abilities of the play characters in regard to the game, as well as predetermined attributes of the play characters, e.g., start-order type or relief type. The game therefore proceeds with enhanced variety, thus offering greater fun.

The program having the aforesaid steps, e.g., steps ST1 to ST20, may have been stored in a machine-readable recording medium and read when the game is started to execute the game.

Although an embodiment has been described in the context of a game program implementing a baseball game, it is to be understood that this is only illustrative and the invention can be applied to other games in which plural teams compete with each other, as well as to simple playing games. The play characters need not always virtual human beings but also may be virtual animals or the like.

It is also to be noted that the invention may lack all or part of the following components, although the described embodiment employs all these components. For instance, the arrangement may be such that the replacement character setting means 70 sets replacement characters by making reference to plural character information stored in the character information storing means 71. The replacement character setting means 70 also may include the setting screen display control means for displaying the screen for enabling setting of the replacement characters on the display screen.

The game progress control means 80 may include the game progress state judging means 81 for judging the state of progress of the game, to give an instruction to effect the replacement based on the state of the progress of the game. The game progress control means 80 also may include, besides the progress state judging means 81 for judging the progressing of the game, the replacement time judging means 82 for judging the time at which the replacement of the character is to be conducted, with the replacement being performed at this judged replacement time. The progress state judging means 81 judges the progress state of the game based on predetermined conditions.

The game progress control means 80 may further include the replacement character judging means 83 for judging which replacement character is to be committed out of the replacement characters, based on the game progress state data, when a plurality of the replacement characters have been set by the replacement character setting means 70, so that this judged replacement character is committed. The replacement character judging means 83 may include the committing order determining means 84 for determining the order or sequence of commitment of the replacement characters.

The replacement character setting means 70 may be arranged to perform the order of setting the replacement characters for each of a series of games.

According to the features of the video game device of the present invention, as well as the features of the video game play control method and recording medium of the invention, the game progress state is controlled by the replacement character setting means which sets replacement characters in the game beforehand, and the game progress control means controlling the progress state of the game by performing a replacement processing for conducting replacement between the replacement character and one play character playing in the game during the progress of the game, so the game player can select replacement characters beforehand before the game begins. If the video game device is entrusted to commit a player which is a play character in a baseball game for example during the game, the video game commits a replacement character which the game player selected beforehand, following a predetermined algorithm according to the play progress state, based on capabilities of the play character relating to the game and attributes (for example, starting member type or relief type in a baseball game) that have been set beforehand. Accordingly, the game becomes rich in variation, and extremely absorbingly interesting.

In one form of the invention, the video game device further comprises a character information storing means for storing multiple character information, wherein the character setting means makes reference to character information to set the replacement character. This feature enables selection of a replacement character in accordance with the character information, thus enhancing realistic feel and fun of the game.

In another form of the present invention, replacement character setting means further comprises setting screen display control means for displaying a screen for setting replacement characters on the display screen. This permits the user to refer to information concerning the replacement characters, thus allowing easy setting of a replacement character.

In still another form of the invention, the game progress control means further comprises progress state judging means for judging the progress of the game, whereby the replacement processing is performed according to the progress state. This permits timely replacement of player characters, thus enhancing realistic feel and fun of the game.

In a further form of the present invention, the game progress control means further comprises: progress state judging means for judging the progress of the game; and replacement time judging means for judging the replacement time of the replacement character in accordance with the progress state, whereby the replacement is performed at this judged replacement time. Thus ensures further timely replacement of player characters, thus enhancing realistic feel and fun of the game.

In a yet further form of the present invention, the progress state judging means judges the progress state of the game based on predetermined conditions. For instance, the stamina of the playing pitcher having come down below a predetermined limit is considered as a condition for replacing the pitcher character. This permits proper replacement of play characters, thus enhancing realistic feel and fun of the game.

In a different form of the present invention, a plurality of replacement characters have been set by the replacement character setting means, and the game progress control means further comprises replacement character judging means for judging which replacement character is to be committed out of the replacement characters, based on the game progress state data, whereby the game progress controlling means commits the judged replacement character. This feature requires an additional item of decision, i.e., selection of a replacement character out of a plurality of replacement characters, thus enhancing realistic feel and fun of the game.

In another different form of the invention, the replacement character judging means further comprises committing order determining means for determining the order of commitment of the replacement characters. This features requires a higher level of decision, i.e., determination of orders of commitment of a plurality of replacement characters during the game, thus further enhancing realistic feel and fun of the game.

In still another different from of the invention, the replacement character setting means is capable of setting replacement characters for each game. This prevents a series of games from becoming monotonous, thus enhancing variety.

In a further different form of the invention, the character information is role data of replacement characters in the game. This enables the positions of the replacement character into consideration, e.g., pitcher, catcher, infielder, outfielder, and so forth, thus enhancing realistic feel and fun of the game.

In a still different from of the invention, the character information includes special characteristics data of replacement characters in the game. The special characteristics are, for example, tendency of the player character to be injured. Addition of such a further factor of consideration enhances realistic feel or the game and provides greater fun.

Although the invention has been described through illustration of a preferred embodiment, it is to be understood that the described embodiment is only illustrative and various changes and modifications may be imparted thereto without departing from the scope of the present invention which is limited solely by the appended claims.

What is claimed is:

1. A game device which sets a game space on a display component and which causes characters to play a game within said game space, said game device being played by a game player, said game device comprising:

a replacement character setting component for allowing the game player to select a plurality of player-set replacement characters before progress of the game is begun;

a game progress control component for controlling progress of the game played by current characters currently playing the game;

a replacement time judging component for judging whether it is time for replacement of a current character based on conditions of the game progress control component and said replacement time judging component judges conditions in favor of replacing a current character and conditions unfavorable to replacing the current character; and a replacement character judging component for judging which player-set replacement character is to replace a current character during progress of the game.

2. The game device according to claim 1 wherein said replacement time judging component judges the score of the game.

3. The game device according to claim 1 wherein said replacement time judging component judges the amount of the game already played and the amount of the game remaining to be played in order to complete the game.

4. The game device according to claim 1 wherein said replacement time judging component judges whether the stamina of a current character is at or below a predetermined level.

5. The game device according to claim 1 wherein said replacement character judging component judges which player-set replacement character is to replace a current character during a game after said replacement time judging component judges that it is time to replace a current character.

6. The game device according to claim 1 wherein said replacement character judging component judges playing characteristics of the player-set replacement characters.

7. The game device according to claim 6 wherein said replacement time judging component judges whether there is available, among the player-set replacement characters, a player having a playing characteristic which is greater than the same playing characteristic of a current character.

8. The game device according to claim 7 wherein said replacement character judging component effects replacement of said current character by one of said player-set replacement characters when said replacement character judging component judges that at least one of said player-set replacement characters has a playing characteristic which is greater than the same playing characteristic of the current player.

9. The game device according to claim 8 wherein said playing characteristic of the player-set replacement characters is the running speed of said player-set replacement character.

10. The game device according to claim 1 further comprising a character information storing component for storing character information of a plurality of available game characters from which the game player selects the player-set replacement characters, said character information storing component making available to the game player the character information of the available game characters stored on the character information storing component when the game player selects the player-set replacement characters in the replacement character setting component.

11. The game device according to claim 10 wherein said character information stored by said character information storing component includes playing characteristics of the available game characters and of the current characters, said replacement character judging component judging the playing characteristics of the player-set replacement characters and the playing characteristics of the current characters.

12. The game device according to claim 11 wherein said replacement character judging component effects replacement of a current character by a player-set replacement character when said replacement character judging component determines that a player-set replacement character has a playing characteristic which is greater to the same playing characteristic of a current character.

13. The game device according to claim 12 wherein said replacement character judging component determines whether a player-set character has a playing characteristic of running speed which is greater than the playing characteristic of running speed of a current character.

14. The game device according to claim 13 wherein said game is a baseball game and said player-set character is a pinch runner.

15. The game device according to claim 11 wherein said replacement character judging component negates replacement of a current character by a player-set character when said replacement character judging component determines that there is no player-set replacement character having a playing characteristic which is greater than the same playing characteristic of a current player.

16. The game device according to claim 1 wherein said game provides designated playing positions for the game characters, said replacement character setting component providing information on the playing characteristic capabilities of a player-set replacement character when said player-set replacement character is playing one of said designated positions, said replacement character judging component effecting replacement of a current character playing a designated position by a player-set replacement character when said replacement character judging component determines that there is available among the player-set characters a player-set character having playing characteristic capabilities for playing the designated position being played by the current character to be replaced.

17. The game device according to claim 16 wherein said game is a baseball game and said designated position of the current character to be replaced is a pitcher.

18. The game device according to claim 16 wherein said game is a baseball game and said designated position of the current character to be replaced is a fielder.

19. The game device according to claim 16 wherein said replacement character judging component negates replacement of the current character playing said designated position by a player-set character when said replacement character judging component determines that there is no player-set replacement character having a playing characteristic capability for playing said designated position being played by said current character.

20. A game device which sets a game space on a display component and which causes characters to play a game within said game space, said game device being played by a game player, said game device comprising:

a replacement character setting component for allowing the game player to select from a plurality of available game characters, a plurality of player-set replacement characters before progress of the game is begun, said replacement character setting component providing information on the playing characteristics of said available game characters to thereby enable the game player to make said selection of the player-set characters based on said information;

a game progress control component for controlling progress of the game played by current characters;

a replacement time judging component for judging whether it is time for replacement of a current character based on conditions of the game progress control component; and a replacement character judging component for judging which player-set replacement character is to replace a current character playing in the game during the progress of the game;

whereby, after said game player has set the player-set replacement characters with knowledge of the playing capabilities of the player-set replacement characters before the game has begun, said replacement character judging component effects replacement of current characters with player-set characters after said replacement character timing component determines that it is time to replace a current character, and wherein after said replacement timing judging component judges that it is time to have a player-set character replace a current character, said replacement character judging component determines whether removal of said current character from the game will have an adverse affect on the game.

21. The game device according to claim 20 wherein said game progress control component controls progress of the game in accordance with a predetermined algorithm.

22. The game device according to claim 20 wherein said replacement character judging component is enabled to select a priority order of player-set characters to replace a current player.

23. The game device according to claim 20 wherein said game is a baseball game and said replacement character judging component is enabled to select the priority order of pitchers to replace the current pitcher.

24. The game device according to claim 20 wherein after said replacement timing judging component judges that it is time to have a player-set character replace a current character, said replacement character judging component determines which one of the plurality of player-set characters is to replace said current player.

25. The game device according to claim 20 wherein said game is a baseball game and said replacement timing judging component judges that it is time to replace a current pitcher with a player-set relief pitcher.

26. A video game device which sets a game space on a screen of a display means and which causes play characters to execute a baseball game within said game space, said video game being played by a game player, said video game device comprising:

replacement time judging means for judging whether it is time to perform a replacement processing for a current play character currently playing in the baseball game and said replacement time judging component judges conditions in favor of replacing a current play character and conditions unfavorable to replacing the current play character;

replacement character setting means for allowing a game player to set a plurality of player-set replacement characters before progress of the baseball game is begun, said replacement character setting means providing capability points of the player-set replacement characters and of the current play characters; and game progress control means for controlling progress of the baseball game, said game progress control means comprising:

replacement character judging means judging which one of said plurality of player-set replacement characters is to perform a replacement processing between said one player-set replacement character and a current play character, during the progress of the baseball game, based on the capability points of said one player-set replacement character and the current play character when it is judged that it is the time to perform the replacement processing by the replacement time judging means.

27. The video game device according to claim 26, wherein each of said plurality of player-set replacement characters is provided with capability points and said replacement processing is performed when the capability points of said one player-set replacement character is greater than the capability points of the current play character.

28. The video game device according to claim 27, wherein said one player with the greater capability points replaces the current player with the lesser capability points when it is judged that it is time to perform the replacement processing by the replacement time judging means.

29. The video game device according to claim 26 wherein said player-set replacement character is a pinch hitter and said capability points represent batting capabilities.

30. A video game device which sets a game space on a screen of a display means and which causes play characters to execute a baseball game within said game space, said video game being played by a game player, said video game device comprising:

replacement time judging means for judging whether it is time to perform a replacement processing for a current play character currently playing in the baseball game and said replacement time judging component judges conditions in favor of replacing a current play character and conditions unfavorable to replacing the current play character;

replacement character setting means for allowing a game player to set a plurality of player-set replacement characters before progress of the baseball game is begun; and game progress control means for controlling progress of the baseball game, said game progress control means comprising:

replacement character judging means judging which one of said plurality of player-set replacement characters is to perform a replacement processing between said one player-set replacement character and a current play character, during the progress of the baseball game, based on the capability of said one player-set replacement character and the current play character when it is judged that it is the time to perform the replacement processing by the replacement time judging means.

31. The video game device according to claim 30, wherein said replacement processing is performed when the capability of said one player-set replacement character is greater than the capability of a current play character.

32. The video game device according to claim 31 wherein said player-set replacement character is a fielder and said capability represents fielding capability.

33. The video game device according to claim 31 wherein said player-set replacement character is a pinch runner and said capability represents running capability.

34. The video game device according to claim 30 wherein said game progress control means effects replacement of the current play character with a player-set replacement character which has been judged to replace the current play character in accordance with the state of progress of the game in which the state of progress of the game follows a predetermined algorithm.

35. The video game device according to claim 34 wherein said state of progress of the game follows said predetermined algorithm based on the capabilities of the current play characters.

36. A game device which sets a game space on a display component and which causes characters to play a game within said game space, said game device being played by a game player, said game device comprising:

a replacement character setting component for allowing the game player to select a plurality of player-set replacement characters before progress of the game is begun;

a game progress control component for controlling progress of the game played by current characters currently playing the game;

a replacement time judging component for judging conditions in favor of replacing a current character and conditions unfavorable to replacing the current character; and a replacement character judging component for judging which player-set replacement character is to replace a current character during progress of the game.

* * * * *